United States Patent [19]

Noreille et al.

[11] Patent Number: 5,094,156

[45] Date of Patent: Mar. 10, 1992

[54] AGGLOMERATION APPARATUS

[75] Inventors: Philippe Noreille, Beauvais, France; Athol R. Pot, Worthington, Ohio

[73] Assignee: Nestec S.A., Vevey, Switzerland

[21] Appl. No.: 687,391

[22] Filed: Apr. 17, 1991

Related U.S. Application Data

[60] Division of Ser. No. 948,098, Dec. 31, 1986, Pat. No. 5,051,269, which is a continuation of Ser. No. 741,456, Jun. 5, 1985, abandoned.

[51] Int. Cl.$^5$ ............ A23F 3/30; A23F 5/38; A23F 5/44; A23G 1/00
[52] U.S. Cl. .................... 99/516; 99/471; 99/474; 99/483; 99/484
[58] Field of Search .......... 99/275, 283, 286, 483, 99/484, 485, 516, 534, 517, 471, 474; 100/176; 426/285, 453, 454; 34/57 A, 168, 173

[56] References Cited

U.S. PATENT DOCUMENTS

| | | | |
|---|---|---|---|
| 2,336,461 | 12/1943 | Beondslee | 99/483 |
| 2,400,292 | 5/1946 | Dalton | 426/454 |
| 3,029,723 | 4/1962 | Schweer | 100/176 X |
| 3,527,647 | 9/1970 | Hager | 99/483 |
| 3,615,670 | 10/1971 | Sienkiewicz | 426/453 |
| 3,625,704 | 12/1971 | Andre et al. | 426/594 |
| 3,652,293 | 3/1972 | Lombana et al. | 426/511 |
| 3,966,975 | 6/1976 | Hansen et al. | 99/516 |
| 4,204,464 | 5/1980 | Strobel | 99/483 |
| 4,308,288 | 12/1981 | Hara et al. | 426/631 |
| 4,951,561 | 8/1990 | Moorman et al. | 99/471 |

Primary Examiner—Timothy F. Simone
Attorney, Agent, or Firm—Vogt & O'Donnell

[57] ABSTRACT

A particulate comestible material is agglomerated by an apparatus which has two movable endless surfaces positioned to form a nip therebetween. The apparatus provides for forming a flowable phase at the surfaces of particulate material supplied to the nip which are then conveyed through the nip so that the particles converge, merge, join and consolidate, and then the flowable phase is resolidified.

6 Claims, 1 Drawing Sheet

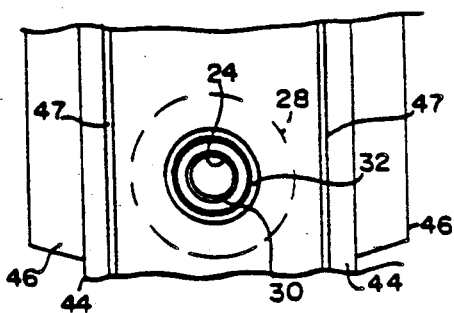
FIG. 3
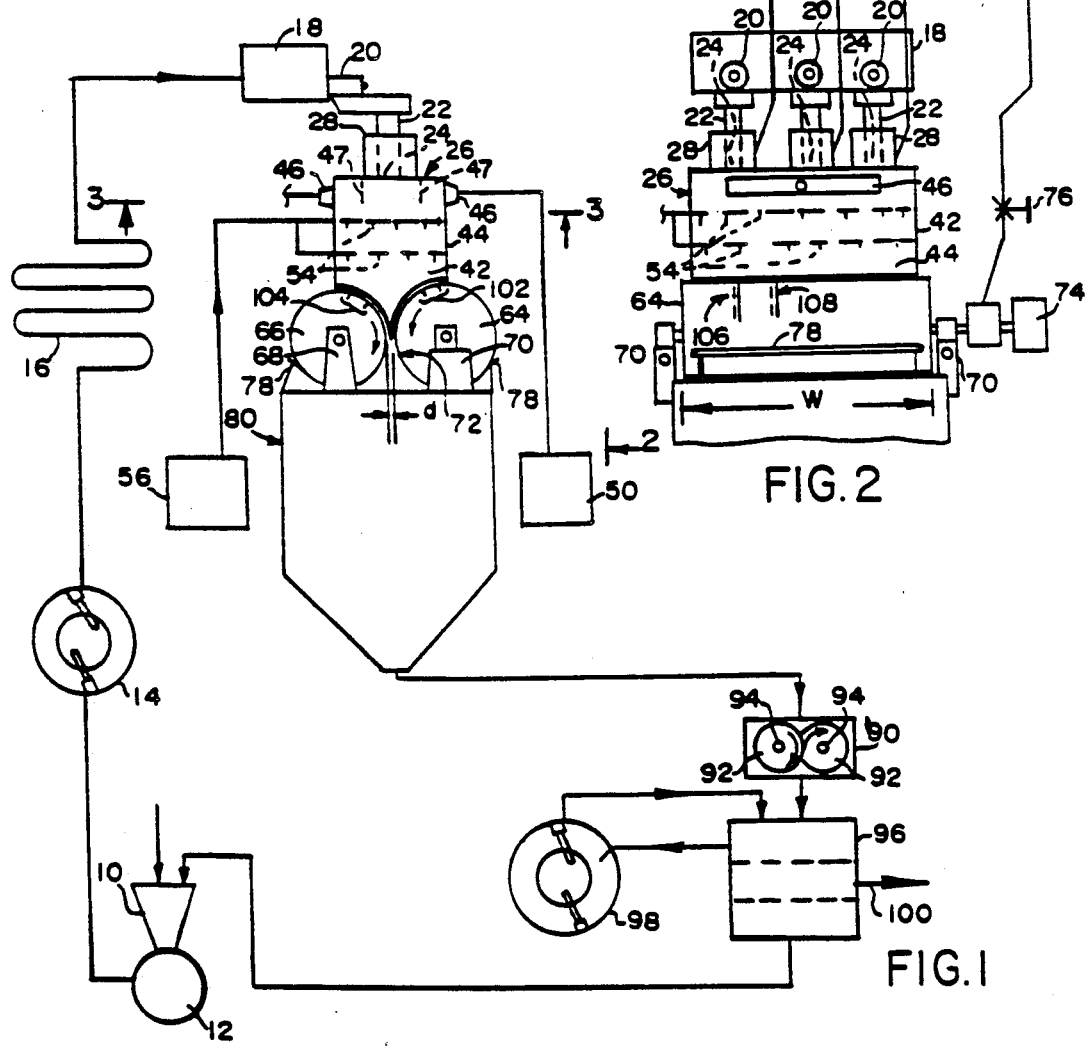
FIG. 2
FIG. 1

AGGLOMERATION APPARATUS

CROSS REFERENCE TO RELATED APPLICATIONS

This is a divisional application of Application Ser. No. 06/948,098 filed Dec. 31, 1986, now U.S. Pat. No. 5,051,269 which in turn, is a continuation application of application Ser. No. 06/741,456 filed June 5, 1985, now abandoned.

BACKGROUND OF THE INVENTION

The present invention relates to agglomeration of comestible materials.

Particulate comestible materials commonly are agglomerated to adjust the bulk density, appearance and other properties of the product. Typically, water soluble particulate materials such as soluble or "instant" coffee are agglomerated by exposing the particles to a vigorous jet of steam. The steam condenses on the particles, moistening and heating them so that each particle is covered with a sticky flowable coating of soft, wet material. When the coated particles contact one another in the turbulent environment created by the jet, the particles adhere to one another and the coatings on the contiguous particles merge, thereby joining the particles into agglomerates. Upon drying, the merged coatings solidify and form welds between adjacent particles in each agglomerate.

Processes of this nature typically produce agglomerates having smooth, rounded edges and a spongy texture. In the case of soluble coffee, the agglomerates ordinarily have a uniform dark color.

Such agglomerates do not look like roast and ground coffee. Roast and ground coffee ordinarily incorporates particles of various shapes including some sharp-edged granular particles, having various colors ranging from light tan to dark brown. Soluble coffees made by freeze-drying processes which do not involve agglomeration typically incorporate sharp-edged particles. Consumers tend to associate the appearance of roast and ground coffee and the appearance of freeze-dried coffee with flavor quality. Accordingly, there has been a need for improved control of particle shape and color in agglomeration of soluble coffee to provide agglomerated products resembling roast and ground coffee or freeze-dried coffee. There has also been need for improvement in control of product bulk density. There have been corresponding needs in agglomeration of other comestible materials such as tea, chicory, cocoa and the like.

The steam jet agglomeration process typically requires large quantities of steam for each unit of product to achieve satisfactory fusion between the particles. High steam consumption imposes a significant cost. Moreover, exposure of the particles to the steam typically causes appreciable loss of fugitive flavor constituents, and this effect ordinarily is related directly to the amount of steam applied. There has accordingly been a need for agglomeration processes and apparatus which alleviate these drawbacks.

SUMMARY OF THE INVENTION

The present invention provides processes and apparatus which address those needs.

In agglomeration processes according to the present invention, a flowable phase is formed at the surfaces of the particles and the particles are deposited on at least one of a pair of opposed mobile surfaces, which may be the endless surfaces of drums or belts. The surfaces move in a downstream direction through a nip, thus conveying the particles through the nip. As the surfaces move into the nip, they converge with one another to consolidate the particles. When the particles contact one another, the flowable coatings on contiguous particles merge, thereby joining the particles into a mass. The mass is removed from the surfaces and the flowable phase is resolidified to solidify the mass. The mass may be fragmented to provide final particles of the desired size.

Intimate interengagement between the particles achieved by use of the mobile surfaces promotes effective fusion between adjacent particles. If the flowable phase is formed by exposing the particles to steam, the quantities of steam required to achieve satisfactory fusion are typically less than those required in the conventional steam-jet agglomeration process. Processes according to the present invention thus mitigate the costs and flavor losses ordinarily associated with steam exposure.

The texture and density of the product may be controlled by controlling the consolidating action of the mobile surfaces. By varying the relationships among the flow rate of particles through the nip, the gap at the nip and the speed of the mobile surfaces, the degree of consolidation may be varied as desired to provide the desired texture in the final product. Lesser degrees of consolidation tend to provide a sponge-like texture. Greater degrees of consolidation tend to provide a firm texture. Fragmentation of such a firm-textured mass typically produces sharp-edged granules resembling freeze-dried coffee. Thus a coffee powder formed by an economical spray-drying process may be agglomerated to provide a final product resembling that produced by freeze-drying.

The mobile surfaces may be arranged to consolidate the particles non-uniformly, thereby to provide a variety of textures in the final product. Those portions of the material consolidated to the greatest degree may be exposed to especially low quantities of steam and hence darkened less than the remainder of the material, thereby providing a product of variegated color, having a texture resembling roast and ground coffee.

Typically, the distance between the mobile surfaces at the nip is significantly greater than the mean size of the particles; the particles may be in the 20 to 40 micron range, whereas the distance at the nip typically is several millimeters. The particles normally are not consolidated to a completely solid mass, and the mass leaving the nip typically incorporates significant voids. The present processes thus provide satisfactory particle fusion while still maintaining the density of the final product within desirable limits.

The present invention also includes apparatus for performing the agglomeration process.

The apparatus as described more particularly below includes two opposed elements, each having an endless surface, the elements being mounted adjacent one another and defining a nip therebetween, the endless surfaces extending through the nip and confronting one another at the nip, and means for moving the elements so that successive opposed portions of the endless surfaces move in a downstream direction into and through the nip and converge with one another as they move downstream towards the nip. Also included are means for supplying a particulate material, means for depositing particles supplied by the supply means upstream of the nip on at least one of the endless surfaces, whereby the particles will be conveyed through the nip and consolidated by the moving endless surfaces, means for forming a flowable phase at the surfaces of the particles before they reach the nip so that upon consolidation of the particles, the flowable phase on the particles will merge to join the particles into a mass, means for resolidifying the flowable phase after passage through the nip, and means for removing the mass from the endless surfaces.

Additionally, the flowable phase forming means may include means for adding moisture to the surfaces of the particles, and the resolidifying means may include means for drying the mass after its removal from the endless surfaces. The depositing means may include a feed orifice disposed remote from the elements and means for projecting the particles through the feed orifice toward the elements. The moisture-adding means may include means for applying steam to the particles as they pass from the feed orifice toward the elements. The steam applying means may include a steam nozzle disposed adjacent the feed orifice and directed toward the elements and means for supplying steam to the nozzle so that the steam exits from the nozzle as a jet directed toward the nip.

The apparatus further may include a chamber having an upstream end adjacent the feed orifice, a downstream end adjacent the elements, sidewalls extending between such ends, and means for projecting a dry gas along the sidewalls, wherein the feed orifice and a steam nozzle are directed into the interior of the chamber to project the particles and steam towards the elements through the chamber.

Additionally, means for altering the position of the elements relative to one another may be included to vary the distance between the endless surfaces at the nip over a range which includes distances greater than a size of particles supplied by the particulate material supply means, wherein the position-altering means is operative to make the distance between the endless surfaces at the nip nonuniform across the width of the nip and wherein the flowable phase forming means is operative to form the flowable phase to a different extent on particles directed towards different portions of the nip.

Other objects, features and advantages of the present invention will be apparent from the following detailed description of certain embodiments, taken in conjunction with the accompanying drawings.

BRIEF DESCRIPTION OF THE DRAWINGS

FIG. 1 is a schematic view of apparatus according to one embodiment of the present invention.

FIG. 2 is a fragmentary view taken along line 2—2 in FIG. 1.

FIG. 3 is a fragmentary view taken along line 3—3 in FIG. 1.

DESCRIPTION OF THE EMBODIMENTS

The apparatus illustrated in FIGS. 1—3 incorporates a feed hopper 10 connected via a metering and conveying unit 12 to a pulverizer 14. The outlet of the pulverizer is connected via heat exchanger 16 to a storage hopper 18.

Three independently operable metering feeders 20 are connected to the storage hopper. Each feeder in turn is connected to a vertically oriented feed tube 22. The lower or downstream end of each feed tube terminates in a feed orifice 24 facing downwardly into the upper or inlet end of a vertically extensive chamber 26. Each feed tube is surrounded by a steam jacket 28. Each steam jacket communicates with the inlet end of chamber 26 via a pair of annular steam nozzles 30 and 32 surrounding the associated feed orifice 24, the steam nozzles also being directed downwardly into the chamber. Apart from the steam nozzle openings and feed orifices, the top of the chamber is closed. Each steam jacket is connected through an independently operable valve 34 (FIG. 2) to a steam manifold 36 which in turn is connected to a steam source 38.

Chamber 26 has a pair of opposed short side walls 42 and a pair of opposed long side walls 44. Each long side wall is provided with an elongated suction chamber 46 opening to the interior of the chamber adjacent its upstream end. A baffle or cupola 47 extends downwardly from the top of the chamber between the feed orifices and the openings of the suction chambers. Suction chambers 46 are connected to a suction source 50. Downstream of the suction chambers, a plurality of air nozzles 54 are disposed on the interior of the chamber along side walls 42 and 44. The air nozzles are provided in a plurality of rows, spaced apart from one another along the vertical or upstream to downstream length of the chamber. Each air nozzle is directed downstream and is directed against the adjacent wall of the chamber. The air nozzles are connected to a source of hot, dry compressed air 56.

A pair of elongated cylindrical rollers 64 and 66 are mounted at the downstream end of chamber 26. Each roller is of uniform diameter and has a smooth, endless circumferential surface. Roller 66 is rotatably mounted on fixed supports 68 of which one is visible in FIG. 1, whereas roller 64 is rotatably mounted on independently adjustable supports 70 (FIG. 2). Rollers 64 and 66 define a nip 72. The distance between the circumferential surfaces of the rollers at the nip may be varied and may be made uniform or non-uniform along the width w of the nip as desired by adjusting supports 70. Nip 72 is aligned with the feed orifices 24 at the lower ends of feed pipes 22 and the nip is thus also aligned with the annular steam orifices 30 and 32 (FIG. 3) surrounding each feed orifice.

Both rollers are linked to a conventional drive unit 74, arranged to rotate the rollers continuously so that roller 64 turns counterclockwise and roller 66 turns clockwise, each as seen in FIG. 1. The drive unit is arranged so that the speeds of rotation of the rollers may be varied.

Both rollers are hollow. The space within each roller is connected via an appropriate rotary union and via regulating valve 76 to steam source 38 so that steam may be admitted within the rollers to maintain their circumferential surfaces at a desired temperature. Scraper blades 78 are fixedly mounted adjacent the rollers so that each scraper blade bears on the circumferential surface of the associated roller.

A conventional fluidized bed dryer 80 is arranged so that its inlet is immediately beneath the rollers, downstream of nip 72. A shroud (not shown) covers the rollers and the inlet end of the dryer. The outlet of the dryer is connected to a chopper 90 having a plurality of saw blades 92 distributed along a pair of parallel shafts 94 so that the saw blades on the two shafts are interleaved between one another. A drive unit (not shown) is arranged to rotate both shafts. The outlet of the chopper is connected to a conventional classifier or sifter 96. The classifier is arranged to direct particles above a predetermined maximum size to a grinder 98, which in turn discharges back into the classifier. The classifier is also arranged to direct particles of less than a predetermined minimum size into feed hopper 10, and to discharge particles between the minimum and maximum sizes via product outlet 100.

In one process according to the present invention, particulate soluble coffee made by conventional spray-drying is supplied to feed hopper 10, blended with fine particles from classifier 96 and pulverized in grinder 14 to a predetermined particle size range, preferably of from about 20 to about 40 microns. The pulverized material is cooled in heat exchanger 16 as it is fed to supply hopper 18. Each feeder 20 continuously supplies particles to the associated feed tube 22 at a predetermined rate. The particles supplied to the feed tubes pass downwardly through the feed tubes and through feed orifices 24 into chamber 26, towards rollers 64 and 66.

Steam supplied to each jacket 28 exits through the associated annular nozzles 30 and 32 as a pair of annular jets surrounding the particles emerging from the associated feed orifice 24. The steam entrains the particles and assists their movement downstream, so that the particles are projected towards the rollers by gravity and by movement of the steam. The steam condenses on the surfaces of the particles, thereby adding water to the surface portions of the particles and heating the particles. The combined heating and moistening action creates a thin, flowable layer on the surface of each particle. When the particles encounter the circumferential surfaces of the rollers, the particles are deposited on those portions of the circumferential surfaces which are temporarily disposed upstream of nip 72.

As the rollers rotate, opposed portions of the circumferential surfaces move codirectionally downstream into and through nip 72, and the opposed portions converge with one another as they approach the nip. For example, portion 102 of the circumferential surface on roller 64 moves to the left as it approaches the nip, whereas portion 104 of the circumferential surface on roller 66 moves to the right, so that the two converge with one another until they reach the minimum distance d at nip 72.

The downstream movement of the circumferential surfaces carries the particles into and through the nip. As the surface portions entering the nip converge with one another, the particles on such surface portions are consolidated with one another. The flowable phases on the surfaces of the particles merge with one another and join the particles into a mass. The mass exits from the nip in the form of a layer, adhering loosely to one of the rollers. As the mass encounters one of the scraper blades 78, it breaks into pieces, which fall into the inlet of dryer 80.

The surfaces of the rollers are maintained at slightly less than 100° C., typically about 90° C., by steam passed through the interior of each roller. Thus there is no significant heat transfer between the particles and the roller surfaces as the particles are conveyed through the nip, and no significant condensation of steam on the roller surfaces. Hot, dry air supplied by source 56 through nozzles 54, preferably at above about 90° C., blankets the interior surfaces of sidewalls 42 and 44. The hot air blanket prevents condensation of steam on the sidewalls and minimizes formation of powder deposits on the sidewalls. Excess steam is removed from the chamber via suction chambers 46, further minimizing condensation on the sidewalls and rollers.

As pieces of the mass fall into dryer 80, they encounter hot, dry air which removes the water added by the steam and resolidifies the flowable phase at the particle surfaces, leaving the particles in each piece welded to one another by solids formerly present in the flowable phase. Preferably, the dryer is arranged so that each piece of the mass entering the dryer falls without touching the interior surfaces of the dryer until at least the outermost portion of the piece is substantially dried. Such an arrangement minimizes adhesion of the pieces to the dryer surfaces. A conventional collection device such as a cyclone separator (not shown) may be connected to the air handling apparatus of the dryer to recover fine particles entrained in the air within the drier. The particles recovered by the collection device may be recycled back to feed hopper 10.

Warm, dry pieces pass from the dryer to chopper 90, where they are fragmented by saw blades 92. The fragments pass to sifter 96. Those fragments bigger than the maximum size established by the classifier are discharged into grinder 98 where they are further fragmented, the resulting finer fragments being returned to the classifier. Fragments and particles smaller than the minimum size established by the classifier are returned to feed hopper 10, whereas fragments between the minimum and maximum sizes established by the classifier exit from the system through product outlet 100.

The color, texture and density of the final product may be varied by adjustment of process conditions. The strength of the bond between particles varies directly with the extent of flowable phase formation. Application of greater amounts of steam increases the extent of flowable phase formation and hence strengthens the bond between particles. In the case of instant coffee and other water soluble comestible products such as instant tea, steam tends to darken the product. This effect varies directly with the amount of steam condensed on the particles, and hence varies with the amount of steam applied. Cooler particles tend to promote greater condensation of the steam on the particles and hence promote darkening and flowable phase formation. Preferably, the particles are at less than about 40° C. when introduced into the steam contacting step. Saturated steam tends to provide greater condensation on the particles than superheated steam.

The steps of contacting the particles with steam, depositing them on the endless surfaces and consolidating them preferably follow in rapid succession. The time elapsed between steam exposure and consolidation is accordingly too short for the water supplied by the steam to reach equilibrium distribution within the particles, as by diffusion into the centers of the particles. Most of the added water remains in the flowable phase until the particles have been consolidated. Thus, satisfactory bonds between particles can be achieved with only modest water addition in the steam contacting step. In typical processes according to the invention, saturated steam is applied at a mass flow rate about 0.05 to about 0.8 times the mass flow rate of the particles. Water added to the material by contact with the steam typically amounts to less than 6 percent and typically less than 4 percent of the weight of the consolidated mass.

As the degree of consolidation at the nip increases, the density of the final product increases slightly and the strength of the bonds between the particles increases significantly, resulting in a firmer texture, and a greater proportion of sharp-edged granules in the final product after fragmentation. Although the present invention is not limited by any theory of operation, it is believed that the increase in bond strength between the particles and the firmer texture observed upon increased consolidation result from better joinder of flowable phases on adjacent particles due to more intimate interengagement of the particles with one another.

The extent of flowable phase formation required to provide satisfactory bonding between the particles decreases as the degree of consolidation increases. Conversely, increasing the extent of flowable phase formation, as by increasing the amount of steam applied, permits achievement of satisfactory bond strength with a lesser degree of consolidation. This interrelationship permits selection of process conditions to provide any of a wide variety of product textures while still retaining satisfactory bond strength. If a product with an extremely firm, sharp-edged granular appearance resembling typical commercial freeze-dried soluble coffee is desired, a relatively high degree of consolidation may be employed in conjunction with a relatively low steam rate. To provide a product with a spongy texture resembling that of conventionally agglomerated soluble coffee, a somewhat higher steam rate may be employed in conjunction with a lower degree of consolidation.

Even if a firm texture is desired, however, the particles preferably are not consolidated to a completely solid mass. Thus the degree of consolidation preferably is controlled so that some voids remain between the particles as they pass through the nip. Stated another way, the total absolute volume of particles entering any portion of the nip per unit time should be less than the product obtained by multiplying the width of the nip portion in question by the minimum distance between the endless surfaces at the nip over that portion of the width of the nip and then multiplying by the speed of the endless surfaces (or the lower speed if the speeds of the two surfaces are unequal). As used herein, the term "total absolute volume" refers to the sum of the volumes of the individual particles, and hence excludes the volume of any void spaces between particles. Under these controlled consolidation conditions, the rollers typically apply no substantial pressure to the material passing through the nip.

The degree of consolidation is directly related to the rate at which the particles are deposited on the endless surfaces, inversely related to the distance between the endless surfaces at the nip and inversely related to the speed with which the endless surfaces move downstream through the nip. Any of these parameters may be either uniform or nonuniform across the width of the nip. With the apparatus described above, wherein both endless surfaces are defined by rigid rollers of the uniform diameter, the speed of each endless surface will be uniform across the width of the nip. Ordinarily, both rollers have identical surface speeds. The distance between the endless surfaces at the nip may be maintained uniform across the width of the nip by adjusting the supports 70 (FIG. 2) at opposite ends of roller 64 to provide equal spacing between the axes of the rollers across the entire width of the nip. Alternatively, the supports may be set to provide unequal spacing between the roller axes at opposite ends of the rollers and hence provide a linear variation in the distance d between the roller surfaces at the nip along the width w of the nip.

The rate at which particles are deposited on the endless surfaces may be made nonuniform by operating the three feeders 20 at different rates to advance particles through each of feed orifices 24 at different rates. If the feeders are operated at the same rate, then the particles advanced by each feeder will be applied to the endless surfaces at the same average rate per unit width of nip. However, even with uniform operation of the feeders, there may be some variation in the rate of deposition per unit width of nip along the width of the nip. The particles may be deposited at a somewhat greater rate on those portions of the endless surfaces aligned widthwise along the nip with the feed orifices than on those portions falling between orifices. For example, particles may be deposited at a somewhat greater rate on surface portion 106 of roller 64, aligned with one of feed orifices 24 than on portion 108 aligned with the gap between adjacent feed orifices. The degree of such nonuniformity may be controlled by controlling the spacing between the feed orifices across the width of the nip. Alternatively, such nonuniformity may be practically eliminated by using a single slit-like feed orifice extending the full width of the nip. In such an arrangement, the steam nozzles may include slit-like orifices or rows of small orifices extending parallel to the feed orifice on opposite sides thereof.

The amount of steam applied per unit of product, and hence the extent of flowable phase formation, also may be uniform or non-uniform across the width of the nip. With apparatus as illustrated in the drawings, the steam flows to the individual steam jackets 28 (FIG. 2) may be varied independently of one another by valves 34. Accordingly, the particles issuing from each of the feed orifices may be exposed to the same or different steam flow rates. Nonuniform steam exposure may be combined with nonuniform consolidation. The rollers may be set to provide a greater gap at the nip, and hence lesser consolidation, adjacent one edge of the nip. The steam flows may be adjusted so that more steam is applied to particles directed to those regions of the nip where the gap is greatest. Thus all of the particles are exposed to combinations of flowable phase formation and consolidation which produce satisfactory bonding between the particles, but different portions of the product are provided with differing textures and differing degrees of darkening. Such processes can convert a substantially uniform coffee powder into a final product having variegated colors and particle shapes, closely resembling roast and ground coffee.

Numerous other variations of the features described above may also be employed in the present invention. For example, the flowable phase at the surfaces of the individual particles may be formed by procedures other than contacting the particles with steam, as by heating the particles and applying atomized liquid water, or by heating to melt the surfaces of the particles. The flowable phase may be formed after the particles are deposited on the endless surfaces, and may be resolidified before the mass is removed from the endless surfaces. Significant advantages, however, are achieved by forming the flowable phase before the particles are deposited on the endless surfaces and resolidifying it after removal of the mass from the endless surfaces. In such processes, there is no need for any heat or mass transfer to occur while the material is on the endless surfaces and hence no need for prolonged residence of the material on the endless surfaces. The material need only remain on the endless surfaces momentarily, while it is carried into the nip and consolidated. Accordingly, the endless surfaces may be moved at high speeds and rapidly recycled through the nip to achieve high throughput rates with relatively small endless surfaces, such as the circumferential surfaces of rollers having reasonable diameter. Moreover, the mass can be more readily removed from the endless surfaces before the flowable phase has solidified.

The endless surfaces need not be defined by rollers, but may instead be defined by a pair of endless belts having opposed, converging belt runs which cooperatively define the nip. A single endless belt and a single roller may be arranged so that the circumferential surface of the roller confronts one run of the belt to define the nip. Because endless belts typically are more complex than rollers, rollers are preferred. Also, although it is preferred to deposit particles on both of the nip-defining surfaces, it is also possible to feed the particles into the nip by depositing them on only one such surface.

The endless surfaces need not be heated by steam, but may instead be heated by hot water, by another hot fluid, or by other conventional heating means such as radiant energy or electrical resistance heating. Also, it is not essential to maintain both endless surfaces at the same temperature.

Any conventional dryer may be used in the resolidification step. A dryer of the type utilized in conventional spray drying operations may be equipped with both spray-drying nozzles and with the roller apparatus illustrated, so that both liquid droplets and pieces of the mass from agglomeration are fed into the dryer simultaneously. The spray-dried particles formed from the liquid droplets typically are smaller than the fragments obtained from agglomeration. Accordingly, the spray-dried particles may be separated from the fragments by classification after the drying and fragmentation operations. The spray dried particles may be directed into the agglomeration operation.

Because the present processes and apparatus permit control and modification of the final product texture, color and density in the agglomeration operation, the color, texture and density of the material supplied to the agglomeration operation are not critical. Thus processes such as spray-drying utilized to prepare the starting powder may be optimized in other respects, such as flavor retention and economy of operation.

Certain aspects of the present invention are illustrated by the following examples.

EXAMPLE I

A spray dried soluble coffee powder having a bulk density of about 0.26 kg/dm$^3$, a medium brown color and a moisture content of about 2.6% is supplied to the feed hopper of apparatus as illustrated in FIGS. 1–3. The powder is blended with undersized particles from the classifying operation, and the blend is pulverized, the resulting particles having a bulk density of about 0.58 kg/dm$^3$ and a moisture content of about 2.75%.

The particles are fed through each of two feed orifices at 5.2 kg/min per orifice. About 0.6 kg of saturated steam per kg of particles is supplied through annular nozzles surrounding each feed orifice. The rollers are arranged to provide a uniform gap at the nip of about 6 mm and rotated to move their circumferential surfaces at approximately 45 meters per minute. The average moisture content of the mass exiting from the nip is approximately 5.2%. The mass falls from the rollers in pieces, which are dried by exposure to hot air in a fluidized bed dryer, fragmented while still warm and passed to a two screen classifying device having a 2.83 mm opening top screen and a 595 micron opening bottom screen. Fragments retained by the top screen are directed to a further fragmentizing operation and then back to the classifier. Undersized particles are returned to the feed hopper and blended with the incoming spray dried powder as aforementioned. The product collected between the top and bottom screens consists primarily of sharp-edged granules, closely resembling the granules of typical freeze dried coffee products. The product has a moisture content of about 3.8%, and a density of 0.29 kg/dm$^3$. It is slightly darker than the original spray dried powder.

EXAMPLE II

A spray dried coffee powder having a moisture content of about 3.5% and a bulk density of 0.39 kg/dm$^3$ is texturized by a process generally similar to that of Example I save that approximately 6.3 kg/min of pulverized powder is supplied through each feed orifice, the rollers are set to provide a uniform gap of 12.5 millimeters at the nip and the circumferential surfaces of the rollers move at about 92 meters per minute. The particles are thus consolidated to a significantly lesser extent than in Example I. The classifier is equipped with a 2.0 mm opening top screen and a 595 micron opening bottom screen. Product collected between the screens has a spongy appearance and a bulk density of approximately 0.25 kg/dm$^3$.

EXAMPLE III

A spray dried coffee having an initial moisture content of about 3.6% and a bulk density of 0.26 kg/dm$^3$ is processed substantially in accordance with Example I, save that the rollers are set to provide a nonuniform gap at the nip, varying from 2.5 millimeters at one edge of the nip to 10 millimeters at the opposite edge, and the rollers are rotated at circumferential surface speeds of approximately 92 meters per minute. The pulverized powder is supplied through a feed nozzle aligned with the region of the nip where the gap is small at 4.5 kg/min, and steam is applied to the powder discharged from that feed nozzle at the rate of about 0.7 kg steam/kg powder. Powder is fed through the feed orifice aligned with the region of the nip where the gap is large at the rate of about 5.4 kg/min, and about 0.87 kg of steam is applied to each kg of powder fed through that orifice. The classifier is equipped with a 2.0 mm opening top screen and a 420 micron opening bottom screen. The product collected between the screens has a variegated appearance closely resembling roast and ground coffee. Its average color is considerably darker than the spray dried powder feed, and its bulk density is identical to that of the feed powder.

EXAMPLE IV

A spray dried soluble tea powder having an initial moisture content of 3.0% and a bulk density of 0.085 kg/dm$^3$ is processed substantially in accordance with Example I, save that the pulverized powder is supplied through a feed nozzle at 7.5 kg/min, steam is applied at the rate of about 0.25 kg steam/kg powder, the rollers are set to provide a uniform gap of 12.5 millimeters at the nip and the circumferential surfaces of the rollers move at about 100 meters/minute. The classifier is equipped with a 2.18 mm opening top screen and a 410 micron opening bottom screen. Product collected between the screens has a spongy appearance and a bulk density of approximately 0.13 kg/dm$^3$.

EXAMPLE V

A spray dried cocoa mix (skim milk, sugar, cocoa and whey solids) having an initial moisture content of 1.0% is processed substantially in accordance with Example I, save that the rollers are set at a uniform gap of 20 millimeters at the nip and move at a circumferential speed of about 110 meters/minute. Steam is applied at the rate of about 0.01 kg steam/kg powder. The moisture content of the powder after consolidation is about 2.0%.

EXAMPLE VI

A spray dried soluble chicory powder having an initial moisture content of 2.5% is processed substantially in accordance with Example I, save that the rollers are set at a uniform gap of 12.5 millimeters at the nip and move at circumferential speed of approximately 110 meters/minute. Steam is applied at the rate of about 0.15 kg steam/kg powder. The moisture content of the powder after consolidation is about 6.5%.

What is claimed is:

1. Apparatus for agglomerating a particulate comestible material comprising:
   (a) means for supplying the particulate material;
   (b) two opposed elements, each having an endless surface, said elements being mounted adjacent one another and defining a nip therebetween, said endless surfaces extending through the nip and confronting one another at the nip;
   (c) means for moving said elements so that successive opposed portions of said endless surfaces move in a downstream direction into and through said nip and converge with one another as they move downstream towards the nip;
   (d) means for depositing particles supplied by said supply means upstream of said nip on at least one of said endless surfaces, whereby the particles will be conveyed through the nip and consolidated by the moving endless surfaces;
   (e) means for forming a flowable phase at the surfaces of the particles before they reach the nip so that upon consolidation of the particles the flowable phase on the particles will merge to join the particles into a mass;
   (f) means for resolidifying the flowable phase after passage through the nip; and
   (g) means for removing the mass from the endless surfaces.

2. Apparatus as claimed in claim 1 wherein said flowable phase forming means includes means for adding moisture to the surfaces of the particles, said resolidifying means including means for drying the mass after its removal from the endless surfaces.

3. Apparatus as claimed in claim 2 wherein said depositing means includes a feed orifice disposed remote from said elements and means for projecting the particles through the feed orifice toward said elements, said moisture-adding means including means for applying steam to the particles as they pass from said feed orifice toward said elements.

4. Apparatus as claimed in claim 3 wherein said steam applying means includes a steam nozzle disposed adjacent the feed orifice and directed toward said elements, and means for supplying steam to said nozzle so that the steam exits from the nozzle as a jet directed toward said nip, the apparatus further comprising a chamber having an upstream end adjacent the feed orifice, a downstream end adjacent said elements and side walls extending between such ends, and means for projecting a dry gas along said side walls, said feed orifice and said steam nozzle being directed into the interior of the chamber to project the particles and steam towards the elements through the chamber.

5. Apparatus as claimed in claim 1 wherein said particulate material supplying means is operative to provide particles of a predetermined size, the apparatus further comprising means for altering the position of said elements relative to one another to vary the distance between said endless surfaces at said nip over a range which incudes distances greater than said predetermined size.

6. Apparatus as claimed in claim 5 wherein said position-altering means is operative to make the distance between said endless surfaces at said nip nonuniform across the width of the nip and said flowable phase forming means is operative to form the flowable phase to a different extent on particles directed towards different portions of the nip.

* * * * *